US012743245B2

(12) United States Patent
Han

(10) Patent No.: US 12,743,245 B2
(45) Date of Patent: Sep. 22, 2026

(54) DISPLAY CONTROL METHOD AND DISPLAY DEVICE

(71) Applicant: Lenovo (Beijing) Limited, Beijing (CN)

(72) Inventor: Shuang Han, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 19/080,662

(22) Filed: Mar. 14, 2025

(65) Prior Publication Data

US 2025/0306838 A1 Oct. 2, 2025

(30) Foreign Application Priority Data

Mar. 29, 2024 (CN) ......................... 202410393072.0

(51) Int. Cl.

*G06F 3/14* (2006.01)
*G06F 3/0482* (2013.01)
*G09G 3/20* (2006.01)

(52) U.S. Cl.

CPC .......... *G06F 3/1423* (2013.01); *G06F 3/0482* (2013.01); *G09G 3/2096* (2013.01); *G09G 2354/00* (2013.01); *G09G 2370/04* (2013.01); *G09G 2370/06* (2013.01); *G09G 2370/12* (2013.01); *G09G 2370/20* (2013.01)

(58) Field of Classification Search

CPC .... G06F 3/1423; G06F 3/0482; G06F 3/1431; G06F 3/1446; G09G 3/2096; G09G 2354/00; G09G 2370/04; G09G 2370/06; G09G 2370/12; G09G 2370/20; G09G 3/20; G09G 2310/0243; G09G 2310/0264; G09G 2370/00

See application file for complete search history.

(56) References Cited

U.S. PATENT DOCUMENTS

| | | | | |
|---|---|---|---|---|
| 8,407,347 | B2 * | 3/2013 | Zhang | G06F 3/1423 710/5 |
| 2016/0334784 | A1 * | 11/2016 | Takahashi | G06F 3/0488 |
| 2018/0032353 | A1 * | 2/2018 | Nagao | G06F 9/451 |
| 2022/0215097 | A1 * | 7/2022 | Soffer | G09G 5/006 |
| 2022/0319468 | A1 * | 10/2022 | Han | G09G 5/14 |
| 2023/0350501 | A1 * | 11/2023 | Yong | G06F 3/03543 |
| 2024/0061637 | A1 * | 2/2024 | Park | G06F 3/1454 |

* cited by examiner

*Primary Examiner* — Antonio Xavier

(74) *Attorney, Agent, or Firm* — ANOVA LAW GROUP, PLLC

(57) ABSTRACT

A display control method includes when a first display device is in a first display mode, obtaining a first image signal from a first electronic device and outputting the first image signal to a first display unit of the first display device, determining that the first display device meets a condition for switching from the first display mode to a second display mode, outputting a mode switching signal to a second display device, and, when the first display device is in the second display mode, obtain a second image signal from a second electronic device and output the second image signal to the first display unit. When in the second display mode, the second display device obtains a third image signal from the second electronic device, and outputs the third image signal through a second display unit of the second display device.

20 Claims, 9 Drawing Sheets

S101

When the first display device is in a first display mode, a first image signal is obtained from a first electronic device, and the first image signal is output to a first display unit of the first display device

S102

It is determined that the first display device meets a condition for switching from the first display mode to the second display mode, and a first mode switching signal is output to the second display device connected to the first display device

S103

When the first display device is in the second display mode, a second image signal is obtained from the second electronic device, and is output to the first display unit When the first display device is in the first display mode, a first image signal from the first electronic device is obtained through the first-type port, and a fourth image signal from the third electronic device is obtained through the third-type port, and the first image signal is displayed in the first display area of the first display unit of the first display device and the fourth image signal is displayed in the second display area of the first display unit — S901

It is determined that the first display device meets the condition for switching from the first display mode to the second display mode, and the first mode switching signal is output to the second display device connected to the first display device — S902

When the first display device is in the second display mode, the second image signal from the second electronic device is obtained through a second-type port, the fourth image signal from the third electronic device is obtained through a third-type port, the second image signal is output in the first display area of the first display unit, and the fourth image signal is output in the second display area of the first display unit — S903

FIG. 9

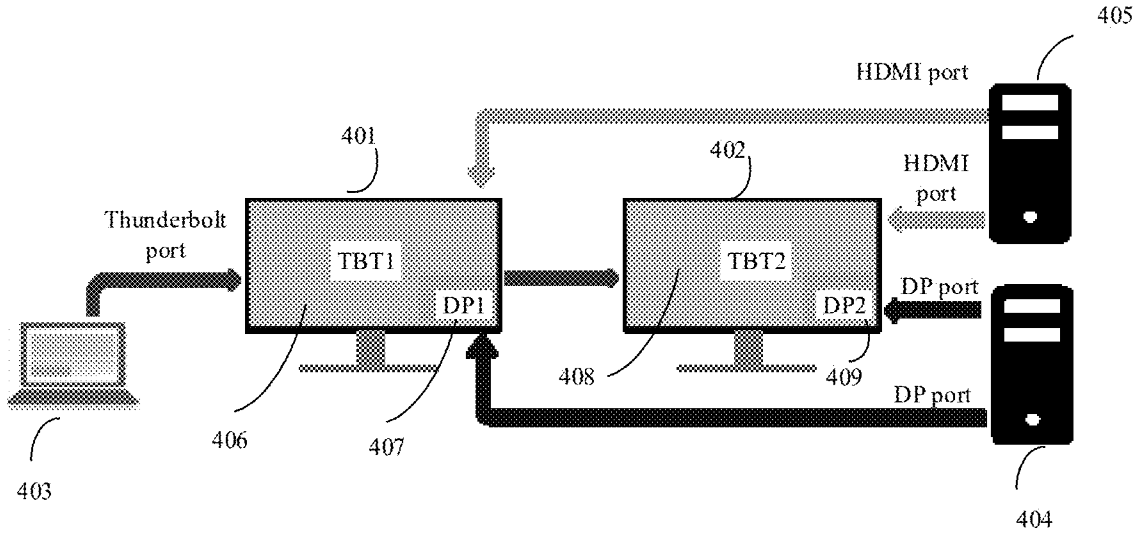

FIG. 10

DISPLAY CONTROL METHOD AND DISPLAY DEVICE

CROSS-REFERENCE TO RELATED DISCLOSURE

This application claims priority to Chinese Patent Application No. 202410393072.0, filed on Mar. 29, 2024, the entire content of which is incorporated herein by reference.

TECHNICAL FIELD

The present disclosure generally relates to the field of display control technologies and, more particularly, to a display control method and a display device.

BACKGROUND

When a user uses two display devices to display different image data from a same electronic device, if the user switches a signal source of the image data on one display device, the two display devices will respectively display images from different signal sources, causing the signal sources providing image data to the two display devices to be out of sync.

SUMMARY

In accordance with the present disclosure, there is provided a display control method including, when a first display device is in a first display mode, obtaining a first image signal from a first electronic device and outputting the first image signal to a first display unit of the first display device, determining that the first display device meets a condition for switching from the first display mode to a second display mode, outputting a mode switching signal to a second display device connected to the first display device, to instruct the second display device to switch from the first display mode to the second display mode, and, when the first display device is in the second display mode, obtain a second image signal from a second electronic device and output the second image signal to the first display unit. When the second display device in the second display mode, the second display device obtains a third image signal from the second electronic device, and outputs the third image signal through a second display unit of the second display device.

Also in accordance with the present disclosure, there is provided a first display device including a multi-function port configured to connect a second display device, a first display unit, and a processing apparatus configured to, when the first display device is in a first display mode, obtain a first image signal from a first electronic device and output the first image signal to the first display unit, determine that the first display device meets a condition for switching from the first display mode to a second display mode, output a mode switching signal to the second display device, to instruct the second display device to switch from the first display mode to the second display mode, and, when the first display device is in the second display mode, obtain a second image signal from a second electronic device and output the second image signal to the first display unit. When the second display device in the second display mode, the second display device obtains a third image signal from the second electronic device, and outputs the third image signal through a second display unit of the second display device.

BRIEF DESCRIPTION OF THE DRAWINGS

To more clearly illustrate the technical solutions of the embodiments of the present disclosure, the drawings needed for use in the description of the embodiments will be briefly introduced below. The drawings described below are some embodiments of the present disclosure. For those ordinary in the art, other drawings can be obtained based on these drawings without any creative work.

FIG. 9 is a flowchart of another exemplary display control method consistent with embodiments of the present disclosure.

FIG. 10 to FIG. 12 are schematic architectural diagrams showing some exemplary application scenarios of FIG. 9 consistent with embodiments of the present disclosure.

DETAILED DESCRIPTION OF THE EMBODIMENTS

Embodiments of the present disclosure will be described below in connection with the drawings. Obviously, the described embodiments are only part of the embodiments of the present disclosure, but not all of the embodiments. Based on the embodiments in the present disclosure, all other embodiments obtained by those skilled in the art without making creative work are within the scope of the present disclosure.

Figure 1:
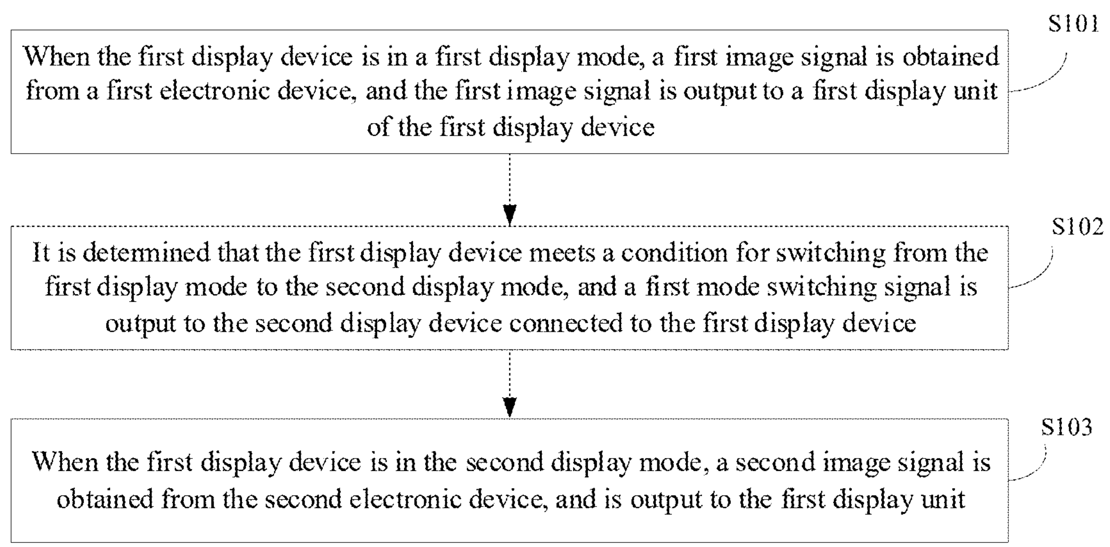
FIG. 1 is a flowchart of an exemplary display control method consistent with embodiments of the present disclosure.

The present disclosure provides a display control method. As shown in FIG. 1 which is a flowchart of a display control method consistent with the present disclosure, in one embodiment, the display control method may be applied to a first display device. The first display device may be an electronic device including a display unit. For example, the display unit may be a display screen, and the first display device may be a display, a smart TV or a desktop computer, etc., including the display screen, and the present disclosure has no limitation on this.

The method of this embodiment may include S101 to S103.

At S101, when the first display device is in a first display mode, a first image signal is obtained from a first electronic device, and the first image signal is output to a first display unit of the first display device.

In one embodiment, a connection may be established between the first display device and a second display device. For example, the first display device may include a multi-function port, and the first display device may be connected to the second display device through its multi-function port. The multi-function port may support the transmission of multimedia data or interactive data (such as control signals, commands or other data). For example, the multi-function port may include a Thunderbolt port or a USB-C port (also known as USB Type-C).

On this basis, the first display device may be directly connected to the first electronic device, or the first display device may be connected to the first electronic device through the second display device. Correspondingly, the first display device may obtain the first image signal from the first electronic device by obtaining the first image signal transmitted by the first display device, or obtain the first image signal from the first electronic device transmitted by the second display device.

In one embodiment, the port type of the port through which the first display device obtains the image signal may be different when the display mode of the first display device is different. Accordingly, in the first display mode, the first display device may obtain the first image signal from the first electronic device through the first-type port. For example, when the first display device is connected to the first electronic device through a first port, the first port may belong to the first-type port. As another example, when the first display device is connected to the first electronic device through the second display device, the first display device may obtain the first image signal from the first electronic device through the multi-function port connected to the second display device, and the multi-function port may belong to the first-type port.

For the sake of distinction, the display unit of the first display device is referred to as the first display unit, and the display unit of the second display device other than the first display device is referred to as the second display unit.

The electronic device in the present disclosure may be an electronic device that is able to provide an image signal source. The electronic device may be an electronic device with a display device or an electronic device without a display device, as long as it is able to provide an image signal. For example, the electronic device may be a host, and it may also be an electronic device such as a laptop, a desktop computer, or a mobile phone.

For the sake of distinction, when the first display device is in the first display mode, an electronic device that provides the image signal is called the first electronic device, and other electronic devices may be called the second electronic device and the third electronic device in sequence according to actual needs. This will not be repeated.

At S102, it is determined that the first display device meets a condition for switching from the first display mode to the second display mode, and a first mode switching signal is output to the second display device connected to the first display device.

The first mode switching signal may be used to indicate that the second display device switches from the first display mode to the second display mode.

Consistent with the disclosure, on the premise that the first display device is connected to the second display device through a multi-function port, the signal source synchronization between the first display device and the second display device may be enabled by default, where the signal source synchronization means that the signal source of the image signal displayed in the first display device and the second display device is the same (that is, it comes from the same electronic device).

In actual applications, the user may also manually enable the signal source synchronization function on the first display device. For example, the first display device may detect a menu display command and display a menu image, in which a signal source synchronization function item for indicating signal source synchronization may be displayed.

Consistent with the disclosure, the menu image may be an on-screen display (OSD) image, which may be generated by the first display device, and the relevant options or function operation items in the menu image may be determined based on the connection status of the first display device and other display devices and the modes of the first display device. The display priority of the OSD image may be higher than the display priority of the image signal.

When the first display device detects that the first display device is connected to the second display device, the signal source synchronization function item in the menu image may be in an operable state. When the first display device and the second display device are not connected, the signal source synchronization function in the menu image may be in an inoperable state. Based on this, when it is detected that the user starts the signal source synchronization function through the signal source synchronization function item, the first display device may determine to start the signal source synchronization with the second display device, and at the same time, the first display device may also send the signal source synchronization start indication to the second display device, where the signal source synchronization start indication may be used to indicate starting the signal source synchronization function.

On the basis of the above, to maintain the signal source synchronization of the image signals between the first display device and the second display device, when the first display device meets the display mode switching condition, the first display device may send the first mode switching signal to the second display device to notify the second display device to switch to the second display mode.

Correspondingly, when the signal source synchronization function is turned off in the first display device, the first display device may also send a signal source synchronization off indication to the second display device, and the signal source synchronization off indication may be used to indicate the turning off of the signal source synchronization function.

Consistent with the disclosure, the first display device may determine that the condition for switching from the first display mode to the second display mode is met in a variety of implementation manners.

For example, in one possible implementation, the first display device may obtain a mode switching instruction based on the display mode switching operation of the user in the menu image. The mode switching instruction may be used to instruct switching from the first display mode to the second display mode, such that the first display device determines that the condition for switching from the current first display mode to the second display mode is met.

The user may trigger the first display device to display the menu image by touching the menu button in the first display device. The display modes that are able to be switched may be displayed in the menu image, and different display modes may represent different sources of image signals. For example, considering that different types of ports are required to obtain image signals in different display modes, different display modes may be represented by different port types, and the port types may be divided into a Thunderbolt (TBT) port, a High Definition Multimedia (HDMI) Port, or a DP (DisplayPort) port.

Based on this, in an optional manner, before displaying the menu image, the first display device may determine the target port type of each port in the first display device that is able to provide the image signal source, and then display the menu image based on each target port type. The menu image may include the display mode corresponding to each target port type. Accordingly, the user may determine which port type the expected image signal comes from, and then select the corresponding display mode in the menu image to generate the mode switching instruction.

In another possible implementation, the first display device may also enable the automatic signal source switching function. That is, the first display device may automatically switch to other signal sources that are able to provide image signals when it detects that the signal source corresponding to the current display mode is abnormal. The signal source abnormality may mean that the image signal from the electronic device corresponding to the display mode cannot be obtained.

For example, the signal source automatic switching function may be enabled by default. When the display device enables the signal source synchronization function, the signal source automatic switching function may be enabled by default.

As another example, the signal source automatic switching function may also be enabled manually by the user, specifically by executing the enabling operation of the signal source automatic switching function in the menu image, which is similar to enabling the signal source synchronization function and will not be described in detail.

Further, when the first display device enables the signal source automatic switching function, the first display device may also send the signal source automatic switching indication to the second display device to instruct the second display device to enable the signal source automatic switching function synchronously.

In this implementation, the first display device may determine that the condition for switching the first display mode to the second display mode is met when it detects that the first image signal from the first electronic device cannot be obtained and detects that the first display device is able to obtain the image signal from the second electronic device.

The inability to obtain the first image signal from the first electronic device may be that the first electronic device is dormant or faulty, or that the first port for obtaining the first image signal has a fault. The ability to obtain the image signal from the second electronic device may be that the first display device detects that it is connected to the second electronic device through the second port or that it is connected to the second electronic device through the second display device.

Of course, the above are only examples of several possible conditions for satisfying the condition for switching from the first display mode to the second display mode. In practical applications, there may be other ways to determine the need to switch to the second display mode, which is not limited.

At S103, when the first display device is in the second display mode, a second image signal is obtained from the second electronic device, and is output to the first display unit.

It can be understood that the first display device may be directly connected to the second electronic device, or the first display device may be connected to the second electronic device through the second display device. Correspondingly, the first display device may obtain the second image signal from the second electronic device, which may be that the first display device obtains the second image signal from the second electronic device or obtains the second image signal from the second electronic device transmitted by the second display device.

In a possible implementation, the port type of the port for obtaining the image signal of the first display device may be different in the display mode of the first display device. On this basis, in the second display mode, the first display device may obtain the second image signal from the second electronic device through the second-type port. For example, when the first display device is connected to the second electronic device through the second port, the second port may belong to the second-type port, and the first-type port may be different from the second-type port. As another example, when the first display device is connected to the second electronic device through the second display device, the first display device may obtain the second image signal from the second electronic device through the multi-function port connected to the second display device, and the multi-function port may belong to the second-type port.

Consistent with the disclosure, when the first display device and the second display device are in the same display mode, the image signals displayed by each may be different, but the image signals may be derived from the same electronic device. Accordingly, when the second display device is in the second display mode, the second display device may obtain a third image signal derived from the second electronic device, and the second display unit of the second display device may output the third image signal.

In particular, when the first display device is in the second display mode, if the first display device obtains the second image signal derived from the second electronic device through the second-type port, then when the second display device is in the second display mode, the second display device can obtain the third image signal derived from the second electronic device through the second-type port in the second display device.

From the above content, it may be seen that, under the premise that the first display device is connected to the second display device, if the first display device meets the conditions for switching from the first display mode to the second display mode, the first display device may send the mode switching signal to the second display device to instruct the second display device to switch to the second display mode, such that the first display device and the second display device are both able to obtain the image signals derived from the same electronic device, realizing the synchronous switching of the first display device and the second display device.

Moreover, since the two display devices are able to switch the signal sources synchronously, the operational complexity caused by the user having to manually switch the signal sources of the two display devices because of the inability to switch the signal sources synchronously may be naturally reduced.

Figure 2:
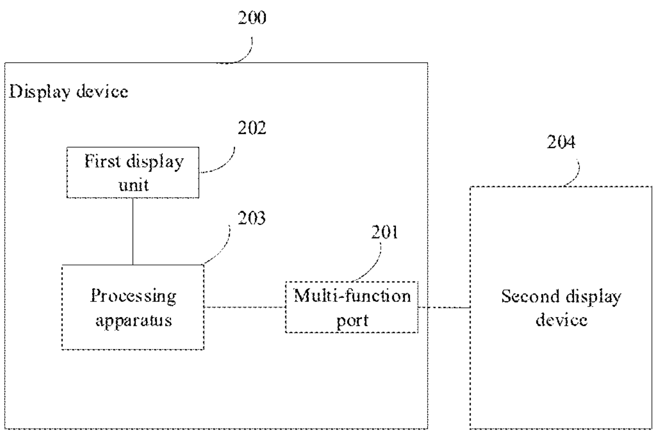
FIG. 2 is a schematic structural diagram of an exemplary display device consistent with embodiments of the present disclosure.

The present disclosure also provides a display device. As shown in FIG. 2, which is a schematic diagram of the composition structure of the display device consistent with the embodiments of the present disclosure, the display device may be used as the first display device mentioned in the embodiments of the present disclosure.

The display device 200 at least includes: a multi-function port 201, a first display unit 202 and a processing apparatus 203.

The multi-function port 201 may be used to connect the second display device 204 outside the display device;

The first display unit 202 may be used to display the image signal;

The processing apparatus 203 may be used to obtain the first image signal from the first electronic device when the display device is in the first display mode, output the first image signal to the first display unit; determine that the display device meets the conditions for switching from the first display mode to the second display mode; and output the first mode switching signal to the second display device, where the first mode switching signal is used to indicate that the second display device switches from the first display mode to the second display mode; and, when the display device is in the second display mode, obtain the second image signal from the second electronic device, and output the second image signal to the first display unit.

When the second display device is in the second display mode, the second display device may obtain the third image signal from the second electronic device, and output the third image signal to the second display unit of the second display device.

The multi-function port may be a thunderbolt port, and of course it may also be other ports that are able to support interactive data and multimedia data.

Figure 3:
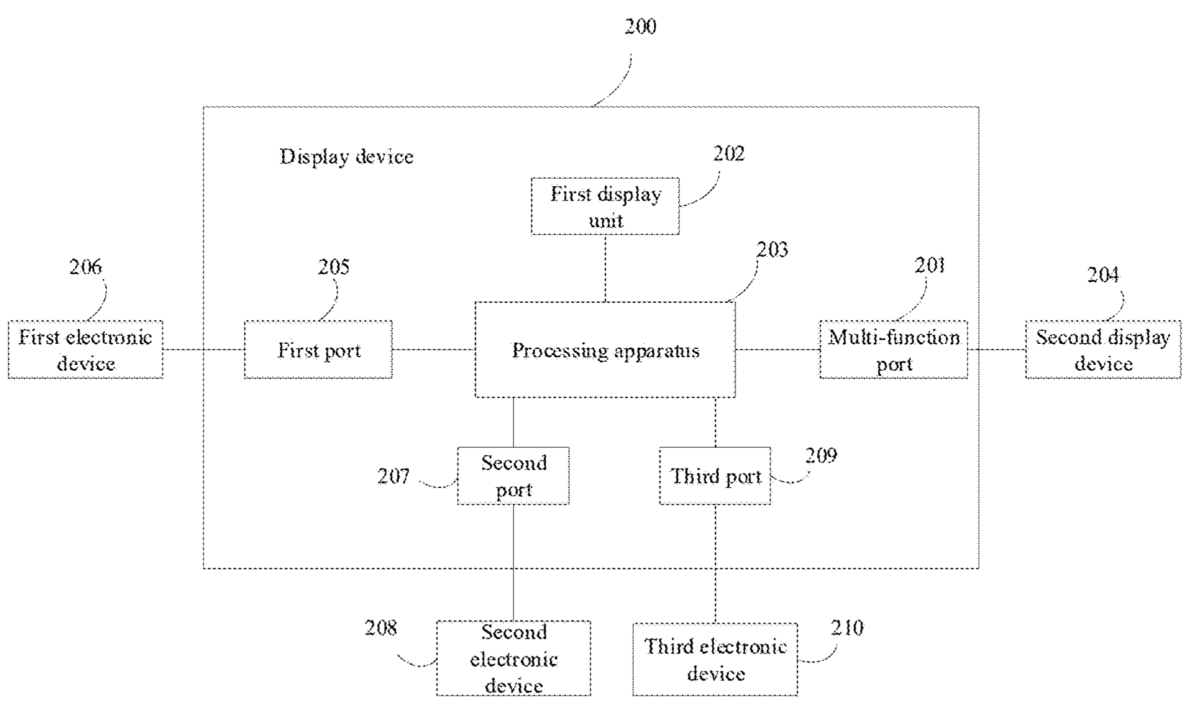
FIG. 3 is a schematic structural diagram of another exemplary display device consistent with embodiments of the present disclosure.

In practical applications, the display device may be connected to the electronic device directly or through a second display device. FIG. 3 shows another possible structural schematic diagram of the display device consistent with the present disclosure.

As can be seen from FIG. 3, in addition to the multi-function port 201, the first display unit 202 and the processing apparatus 203 mentioned above, the display device may also be used to connect different types of ports of different electronic devices.

For example, in a possible implementation, the display device 200 may also include: a first port 205, which is used to connect the first electronic device 206. The first port may be a first-type port. On this basis, in the first display mode, the processing apparatus can obtain a first image signal from the first electronic device through the first port.

In another possible implementation, the display device 200 may also include: a second port 207, which is used to connect the second electronic device 208, where the second port is a second-type port. On this basis, in the second display mode, the processing apparatus may obtain the second image signal from the second electronic device through the second port.

In practical applications, the display device may have only one of the first port 205 and the second port 207, or may have both the first port and the second port. Only one of the first port and the second port may be connected to the electronic device, or both may be connected to the electronic device, without limitation.

For example, both the first-type port and the second-type port may include a Thunderbolt port, a DP port or an HDMI port, and the first-type port and the second-type port may belong to different types of ports. For example, the first-type port may be a DP port, and the second-type port may be a Thunderbolt port. As another example, the first-type port may be a Thunderbolt port, and the second-type port may be a DP port, etc., which will not be repeated.

Correspondingly, the specific composition structure of the second display device connected to the display device may be similar, and the second display device may also be connected to different electronic devices directly or indirectly through the display device, which will not be repeated here.

To facilitate the understanding of the first display mode and the second display mode of the first display device and the second display device in the present disclosure, the composition architecture of an application scenario applicable to the scheme of the present disclosure is described below.

Figure 4:
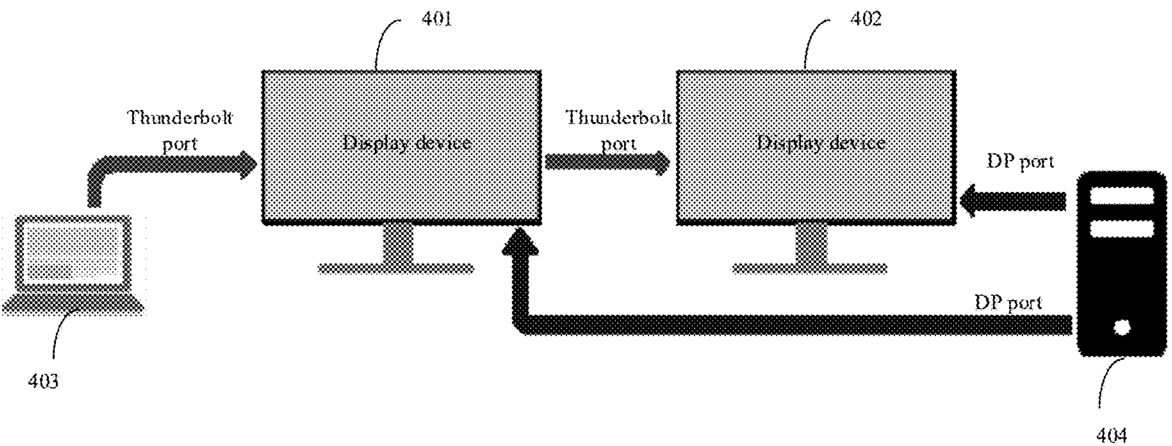
FIG. 4 is a schematic architectural diagram showing an exemplary application scenario consistent with embodiments of the present disclosure.

As shown in FIG. 4, which shows a schematic structural diagram showing an application scenario of the present disclosure, the display device 401 is connected to another display device 402 via a Thunderbolt port (TBT port), and the Thunderbolt port supports the transmission of interactive data and image signals between the two display devices. In FIG. 4, the transmission of the image signal obtained through the Thunderbolt port from the display device 401 to the display device 402 is taken as an example, and the connection line corresponding to the Thunderbolt port in FIG. 4 is directed from the display device 401 to the display device 402.

The display device 401 is connected to the laptop computer 403 via the Thunderbolt port. In FIG. 4, the electronic device connected to the display device 401 via the Thunderbolt port is a laptop computer, as an example. Of course, the laptop computer 403 may be replaced with other electronic devices in some other embodiments.

At the same time, the display device 401 may be connected to the first host device 404 via the DP port. As shown in FIG. 4, the electronic device connected to the display device 401 via the DP port is a host device, as an example. Of course, the host device may be replaced with other electronic devices such as a mobile phone or a laptop computer, in some other embodiments.

The display device 402 is connected to the first host device 404 via the DP port.

In FIG. 4, the laptop computer 403 supports the daisy chain function, such that the laptop computer 403, the display device 401 and the display device 402 are connected through the daisy chain. The daisy chain function may connect multiple display devices in series and connect them to a single port. As shown in FIG. 4, the laptop computer and two display devices are connected in series. At this time, different image contents from the laptop computer may be displayed on different display devices.

First, the embodiment where the display device 401 is used as the first display device will be used as an example.

It may be clearly seen from FIG. 4 that the display device 401 is connected to different electronic devices through two different types of ports, that is, different electronic devices are connected through the Thunderbolt port and the DP port respectively, and the display device 401 is also connected to another display device 402 through the Thunderbolt port (a multi-function port).

Assuming that the display device 401 and the display device 402 both use the Thunderbolt port as the signal source for providing image signals in the first display mode, in the first display mode, the laptop computer 403 is equivalent to the first electronic device mentioned above. On this basis, the display device 401 may obtain two image signals from the laptop computer 403 through the Thunderbolt port connected to the laptop computer 403, which are respectively called image signal A and image signal B. The display device 401 may output the image signal A to the display unit of the display device 401, and transmit the image signal B to the display device 402 through the Thunderbolt port connected to the display device 402, to display the image signal B in the display unit of the display device 402.

When the user selects to switch the DP port as the signal source through the menu image displayed in the display device 401, the display device 401 may determine that it needs to switch to the second display mode, or the display device may detect that the laptop computer 403 is dormant or faulty, etc. Then, when the display device 401 starts the signal source automatic switching function, the display device 401 may detect that the display device is connected to the second electronic device through the DP port, and the display device 401 may also determine that it needs to switch to the second display mode.

On this basis, the display device 401 may send the mode switching signal to the display device 402 through the Thunderbolt port between the display device 402 to notify the display device 402 that it needs to switch to the second display mode, that is, switch the signal source to the signal source of the DP port.

In the second display mode, the display device 401 may obtain the image signal C of the first host computer 404 through the DP port and output the image signal C to the display unit of the display device 401. For example, the processing apparatus of the display device 401 may include a first-type control chip, and the signal source switching may be controlled by the first-type control chip. For example, the first-type control chip may include a display processing chip Scaler, and the Scaler may switch the signal source from the Thunderbolt port to the DP port to obtain the image signal from the DP port.

Similarly, the display device 402 may also obtain the image signal D provided by the first host computer 404 through the DP port, and output the image signal D to the display unit of the display device 402. The image signal C and the image signal D may represent different image signals.

It may be understood that the above is explained by taking the display device 401 as the first display device as an example. When the display device 402 is used as the first display device, in the first display mode, the display device 402 as the first display device may not be directly connected to the laptop computer 403 through the Thunderbolt port, but may be connected to the display device 401 through the Thunderbolt port and connected in series with the laptop computer 403 as the first electronic device through the display device 401. On this basis, the display device 402 may obtain the image signal from the laptop computer 403 through the display device 401. In addition, the display device 402 may determine that it needs to switch to the DP port as the signal source, and its processing process may be similar to the processing process of the display device 401 as the first display device, which will not be repeated.

It can be understood that FIG. 4 is only an example. In actual applications, there may be no DP port connection between the display device 401 and the first host computer 404. In this case, in the second display mode, the display device 401 may also obtain the image signal C from the first host computer 404 through the display device 401. For example, the display device 402 may obtain the image signal C and the image signal D provided by the first host computer 404 through the DP port, and the display device 402 may transmit the image signal C to the display device 401 through the thunderbolt port connected to the display device 401, to output the image signal C in the display unit of the display device 401.

Of course, the first display mode may also be to use the DP port as the signal source for the display device to obtain the image signal. In this case, the first host computer 404 may be used as the first electronic device. Correspondingly, the second display mode may be to use the thunderbolt port as the signal source for the display device to obtain the image signal, and the laptop computer 403 may be used as the second electronic device. The specific process is similar and will not be repeated.

It should be understood that FIG. 4 is an example of a possible situation of two port types including the first port and the second port in the display device. In actual applications, the first port and the second port may also be ports of other port types. As shown in FIG. 4, the DP port may be replaced with an HDMI port, or the Thunderbolt port between the second electronic device may be replaced with an HDMI port, etc., which will not be elaborated herein.

It is understandable that when the first display device is in the first display mode, if the first electronic device enters a dormant state or other reasons cause the first electronic device to be unable to provide the first image signal, and the first display device does not turn on the automatic switching function of the signal source, the first display device may display a black screen because of the inability to obtain the first image signal, and accordingly, the second display device may also display a black screen because of the inability to obtain the image signal from the first electronic device.

It is understandable that in the above embodiment, the switching of two display modes is taken as an example. On this basis, each display mode may correspond to an electronic device, such that the first display device may be directly or through the second display device connected to two electronic devices, and the port types corresponding to the ports for providing image signals of the two electronic devices may be different.

In some other embodiments, the first display device may be directly or through the second display device connected to three or more electronic devices, and the port types corresponding to the ports for providing image signals of different electronic devices may be all different. On this basis, the first display device may switch from one electronic device providing image signals to any other electronic device providing image signals, which may be considered as switching from the first display mode to the second display mode.

Of course, the first display device may also have a third display mode. When the first display device is in the third display mode, the first display device may obtain an image signal from a third electronic device. For example, the first display device may obtain an image signal from the third electronic device obtained by the second display device.

As another example, the first display device may be connected to the third electronic device through a third port, and accordingly, the first display device may directly obtain the image signal provided by the third electronic device from the third electronic device, such as the first display device obtains the image signal from the third electronic device through a third-type port.

The display device shown in FIG. 3 may also include: a third port 209 which is a different port type from the first port and the second port. The third port 209 may be used to connect the third electronic device 210, and the third port may be a third-type port.

For example, the first-type port is a DP port, the second-type port may be a Thunderbolt port, and the third-type port may be an HDMI port.

When the display device is in the third display mode, the processing apparatus may obtain an image signal from the third electronic device through the third port as the third-type port.

Figure 5:
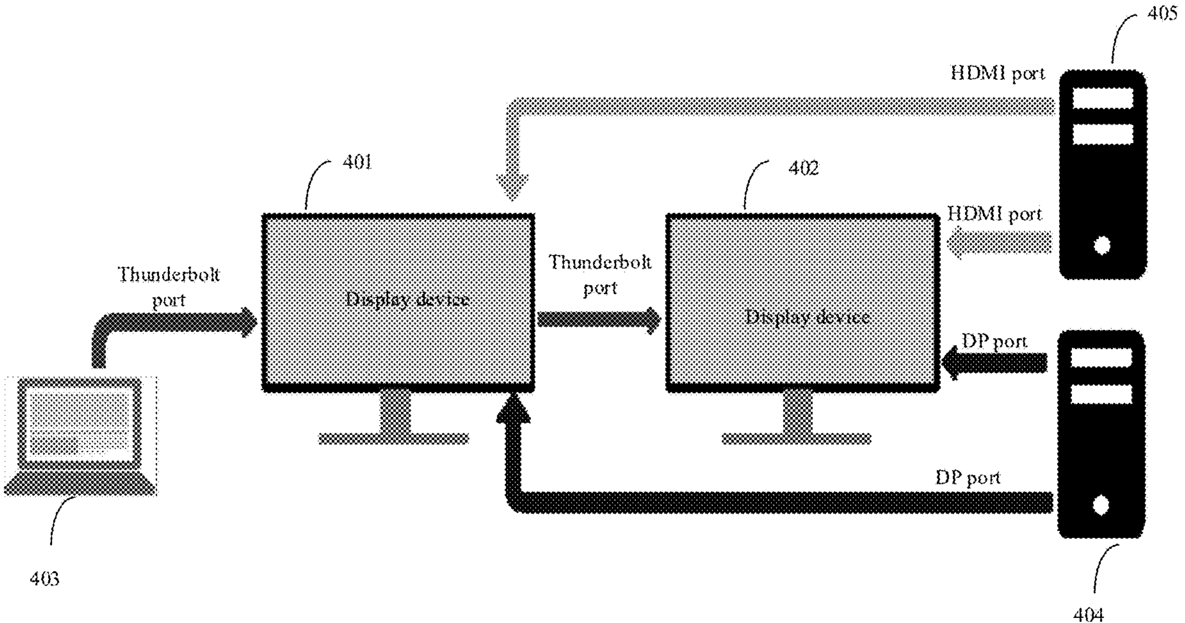
FIG. 5 is a schematic architectural diagram showing another exemplary application scenario consistent with embodiments of the present disclosure.

As shown in FIG. 5, which is a schematic architecture diagram showing another application scenario of the present disclosure, compared with FIG. 4, the display device 401 and the display device 402 are also connected to the second host computer 405 through their respective HDMI ports. The second host computer 405 in FIG. 5 may also be replaced with a mobile phone, a laptop or other types of electronic devices.

In the scenario of FIG. 5, the first display mode and the second display mode may be as shown in FIG. 4.

In addition, in FIG. 5, the first display mode may also be using the HDMI port as a signal source of the image signal, and the second display mode may be using the Thunderbolt port or the DP port as a signal source of the image signal. Or, the first display mode may be using the Thunderbolt port or the DP port as a signal source of the image signal, and the second display mode may be using the HDMI port as a signal source of the image signal. The specific switching from the first display mode to the second display mode may be as described above, and no further description is given.

In addition, in FIG. 5, it may also be considered that the display device supports the third display mode. The first display mode, the second display mode and the third display mode may be respectively based on ports of different port types as signal sources for providing image signals. For example, the first display mode may be using the Thunderbolt port as a signal source for image signals output by the display device, the second display mode may be using the HDMI port as a signal source for image signals output by the display device, and the third display mode may be using the DP port as a signal source for image signals output by the display device.

The display device may support switching from the first display mode to the third display mode; or may support switching from the second display mode to the third display mode; or may support switching from the third display mode to the first display mode, and from the third display mode to the second display mode.

For ease of understanding, the third display mode is explained by taking the HDMI port as an example of a signal source for providing image signals. Assuming that the display device 401 determines that it needs to switch to the third display mode, the display device 401 may also send a second mode switching signal to the display device 402 through the Thunderbolt port connected to the display device 402, and the second mode switching signal may be used to instruct to switch the display mode to the third display mode. Also, in the third display mode, the display device 401 may obtain the image signal E from the second host computer 405 through the HDMI port, and the display device 402 may obtain the image signal F from the second host computer 405 through the HDMI port. The image signal E and the image signal F may be different image signals.

In the above embodiments of the present disclosure, there may be multiple possibilities for the specific implementation of the first display device outputting the first mode switching signal to the second display device.

In one possible implementation, the processing apparatus of the first display device may include at least: a first-type control chip and a second-type control chip. Accordingly, the first-type control chip of the first display device may send the first mode switching signal to the second-type control chip of the first display device. The first mode switching signal may be transmitted to the second-type control chip in the second display device connected to the first display device through the second-type control chip of the first display device, such that the first-type control chip of the second display device obtains the first mode switching signal through the second-type control chip of the second display device.

The first-type control chip may include a display processing chip Scalar. Of course, the first-type control chip may also be integrated with a microcontroller unit (MCU), and there is no restriction on this.

The second-type control chip may be a command control chip. For example, the command control chip may be a power delivery management (PD) chip in the first display device. The PD chip may support the PD charging protocol, which is a power delivery protocol published by the USB-IF organization. The PD charging protocol allows the addition of custom functions. Based on this, the present disclosure may use the PD chip as a command control chip to transmit the first mode switching signal to the PD chip of the second display device.

In an optional manner, the first-type control chip of the first display device may also first transmit the first mode switching signal to the third-type control chip of the first display device, and then the third-type control chip may transmit the first mode switching signal to the second-type control chip of the first display device. For example, the third-type control chip may be a digital media controller (DMC), and of course, it may also be other control chips, without limitation.

It is understandable that, in addition to sending the first mode switching signal to the second display device, the first display device may also receive the second mode switching signal transmitted by the second display device to the first display device. The second mode switching signal may be used to instruct to switch from the second display mode to the third display mode. As described above, when the first display device is in the third display mode, the first display device may obtain the image signal from the third electronic device, and output the image signal from the third electronic device to the first display unit.

The following uses two different implementations as examples to illustrate the process of the second display device controlling the first display device to switch modes.

Figure 6:
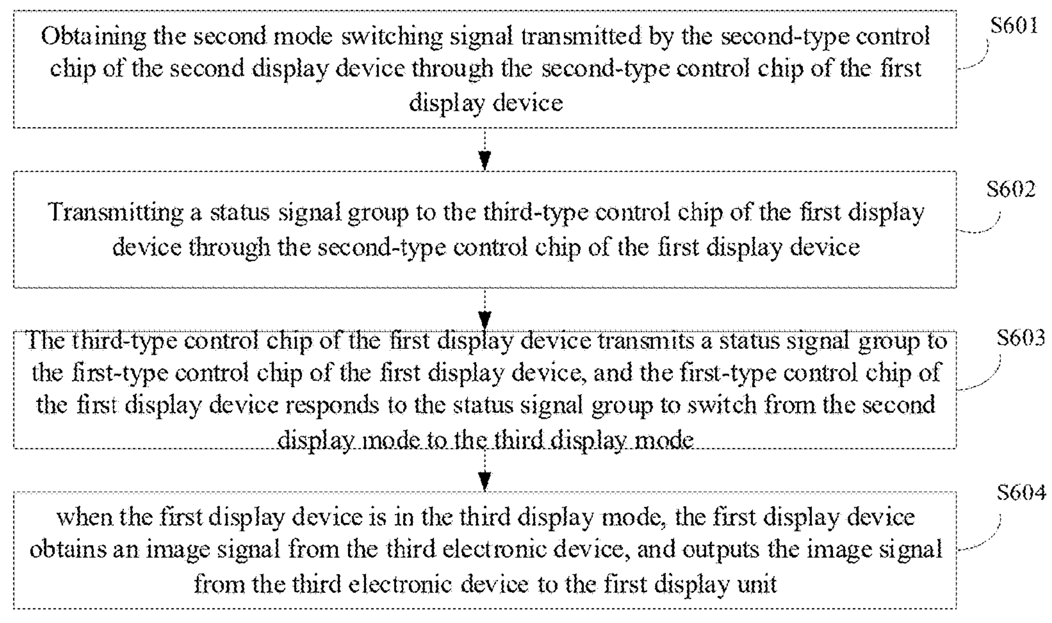
FIG. 6 is a flowchart showing switching of the display mode of a first display device under the control of a second display device consistent with embodiments of the present disclosure.

As shown in FIG. 6, which is a schematic diagram showing an implementation process of the first display device switching the display mode under the control of the second display device, the solution of this embodiment is applied to the first display device, including:

S601, obtaining the second mode switching signal transmitted by the second-type control chip of the second display device through the second-type control chip of the first display device, where the second mode switching signal is used to instruct to switch from the second display mode to the third display mode;

S602, transmitting a status signal group to the third-type control chip of the first display device through the second-type control chip of the first display device, where the status signal group is used to instruct to switch the display mode to the third display mode;

For example, in a possible implementation, the second-type control chip in the display device is connected to the third-type control chip, and the third-type control chip is connected to the first-type control chip.

Wherein, there are multiple first signal lines between the first-type control chip and the third-type control chip, and there are also multiple first signal lines between the second-type control chip and the third-type control chip. For example, the first signal line only supports status data transmission, such as the first signal lines can all be general-purpose input/output (GPIO) buses.

On this basis, the second-type control chip can control the status signals transmitted on each first signal line, such as transmitting 1 or 0, so that the status signals on multiple first signal lines form a status signal group. The status signal group can indicate that the display mode needs to be switched at present, and the display mode to be switched is the third display mode.

For example, taking the three first signal lines connected between the second-type control chip and the third-type control chip as an example, "110" may indicate that the display mode needs to be switched to the third display mode, the first signal lines may be controlled to transmit "1", "1" and "0" respectively, to transmit the status signal "110" to the third-type control chip. For example, the level of the corresponding pins of the three GPIO buses may be used to transmit 1 or 0, and there is no restriction on this.

S603, the third-type control chip of the first display device transmits a status signal group to the first-type control chip of the first display device, and the first-type control chip of the first display device responds to the status signal group to switch from the second display mode to the third display mode.

For example, the third-type control chip may control the status signals transmitted on each first signal line between the third-type control chip and the first-type control chip, thereby forming the status signal group. The specific process of the second-type control chip transmitting the status signal group to the third-type control chip is similar to that described above, and will not be repeated.

S604, when the first display device is in the third display mode, the first display device obtains an image signal from the third electronic device, and outputs the image signal from the third electronic device to the first display unit.

For ease of understanding, a simple description is given in combination with a composition structure of a processing apparatus in a display device.

Figure 7:
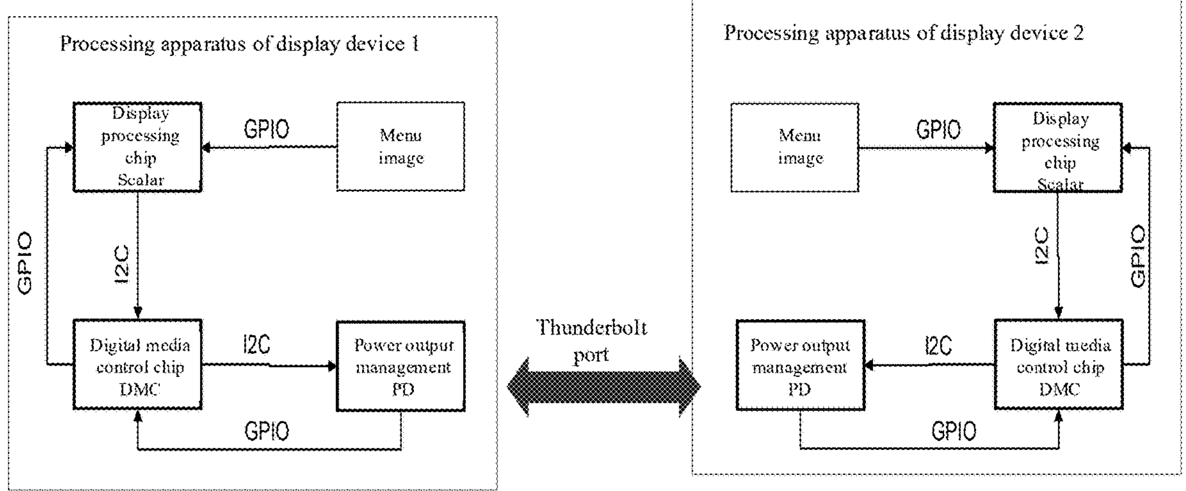
FIG. 7 shows a schematic architecture for mode switch control between processing apparatuses of two display devices consistent with embodiments of the present disclosure.

As shown in FIG. 7, which shows a schematic diagram of an architecture for realizing mode switching control between processing apparatuses of two display devices, the processing apparatus of the display device includes three types of control chips. In FIG. 7, the first-type control chip is a display processing chip Scalar, the second-type control chip is a power transmission management PD chip, and the third-type control chip is a digital media control chip DMC, as an example.

As can be seen from FIG. 7, for any processing apparatus of a display device, there are two groups of signal lines between Scalar and DMC. One group of signal lines is a combination of at least one first signal line, such as the first signal line is a GPIO bus as an example in FIG. 7. The other group of signal lines may be a combination of at least one second signal line, such as the second signal line is a circuit bus (Inter-Integrated Circuit, I2C) as an example in FIG. 7. As can be seen from FIG. 7, both the GPIO bus and the I2C bus are directional.

Similarly, there may also be two groups of signal lines between DMC and PD chip, which will not be repeated.

Based on this, when the Scalar in the display device 1 determines that the display mode switching condition is met, such as the mode switching instruction input by the user detected by the Scalar through the menu image in FIG. 7, the Scalar may send the mode switching instruction (such as the first mode switching instruction or the second mode switching instruction) to the DMC through the I2C bus. The DMC may transmit the mode switching instruction to the PD chip through the I2C bus.

The PD chip of display device 1 may send the mode switching instruction to the PD chip of display device 2 through the Thunderbolt port connected to display device 2 in display device 1, such that display device 2 obtains the mode switching instruction.

For the convenience of description and understanding, the mode switching instruction obtained by display device 2 which is the second mode switching instruction will be used as an example. After display device 2 obtains the second mode instruction through the PD chip, since display device 2 does not support the PD chip to transmit data to the DMC chip of display device 2 through I2C, the PD chip of display device 2 may transmit the status signal group to DMC through the GPIO bus by pulling down or raising the level of each GPIO pin, to indicate that DMC needs to switch the display mode to the third display mode through the status signal group. Correspondingly, DMC may also transmit the same status signal group to the Scalar chip of display device 2 through the GPIO bus, such that Scalar switches the display mode to the third display mode in response to the status signal group.

It can be understood that in the implementation of FIG. 6, when the display device supports a large number of display modes, and the number of GPIO buses between different types of control chips may be relatively limited, the types of status signal groups that are able to be transmitted by the GPIO bus may also be relatively limited. Therefore, it is likely that all possible display modes cannot be fully represented by the status signal group.

Figure 8:
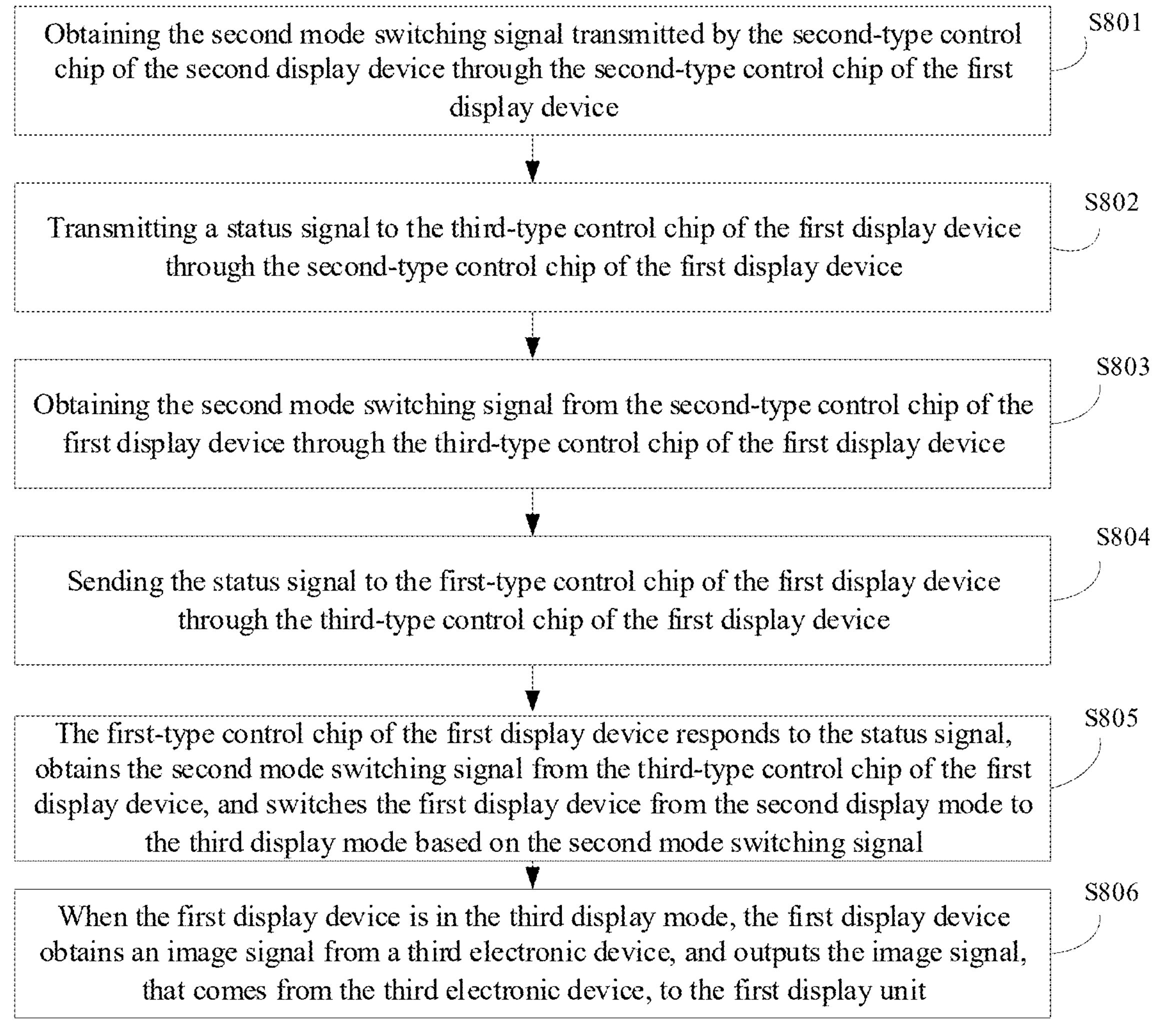
FIG. 8 is another flowchart showing switching of the display mode of a first display device under the control of a second display device consistent with embodiments of the present disclosure.

Based on this, the present disclosure also provides another possible implementation of the second display device controlling the first display device to switch the mode. As shown in FIG. 8, which shows another implementation flow chart of the first display device switching the display mode under the control of the second display device, the scheme of this embodiment is applied to the first display device, including:

S801, obtaining the second mode switching signal transmitted by the second-type control chip of the second display device through the second-type control chip of the first display device, where the second mode switching signal is used to instruct to switch from the second display mode to the third display mode.

S802, transmitting a status signal to the third-type control chip of the first display device through the second-type control chip of the first display device, where the status signal is used to instruct switching the display mode of the first display device. Different from the previous status signal group, the status signal may only indicate that the display mode needs to be switched, but does not need to reflect to which display mode to switched. For example, the status signal is 1, which indicates that the display mode needs to be switched. Therefore, only one signal line is needed to transmit the status signal.

S803, obtaining the second mode switching signal from the second-type control chip of the first display device through the third-type control chip of the first display device.

It can be understood that after the second-type control chip transmits the status signal to the third-type control chip, the second-type control chip may still store the second mode switching signal. After the third-type control chip of the first display device obtains the status signal, the third-type control chip may determine that there is a display mode switch, but the third-type control chip may not be sure to which display mode to switch. Based on this, in one embodiment, the third-type control chip may respond to the status signal and actively obtain the second mode switching signal from the second-type control chip of the first display device.

For example, the second-type control chip and the third-type control chip in the display device may connected through at least one first signal line and at least one second signal line, and the first signal line between the two control chips may support data transmission from the second-type control chip to the third-type control chip, and the second signal line between the two control chips may support data transmission from the third-type control chip to the second-type control chip. Similarly, the third-type control chip may also be connected to the first-type control chip through at least one first signal line and at least one second signal line, where he first signal line between the two control chips may support data transmission from the third-type control chip to the first-type control chip, and the second signal line between the two control chips may support data transmission from the first-type control chip to the third-type control chip.

For example, the first signal line may be a GPIO bus, and the second signal line may be an I2C bus, as shown in FIG. 7, which will not be repeated here.

S804, sending the status signal to the first-type control chip of the first display device through the third-type control chip of the first display device.

S805, the first-type control chip of the first display device responds to the status signal, obtains the second mode switching signal from the third-type control chip of the first display device, and switches the first display device from the second display mode to the third display mode based on the second mode switching signal.

Similar to the above, in the first display device, the third-type control chip may transmit the status signal to the first-type control chip through the first signal line, and the second-type control chip may actively obtain the second mode switching signal from the third-type control chip through the second signal line in response to the status signal.

For ease of understanding, the following description is still provided in conjunction with FIG. 7. As described above, after the PD chip of the display device 2 obtains the second mode switching signal, the PD chip of the display device 2 may transmit the status signal to the DMC of the display device 2 through the GPIO bus to inform the DMC that the display mode needs to be switched. In response to the status signal, the DMC of the display device 2 may actively read the second mode switching signal from the PD chip through the I2C bus. Similarly, after the DMC reads the second mode switching signal, the DMC may also transmit the status signal to the Scalar chip through the GPIO bus, and the Scalar chip may also read the second mode switching signal from the DMC chip through the I2C bus in response to the status signal.

S806, when the first display device is in the third display mode, the first display device obtains an image signal from a third electronic device, and outputs the image signal, that comes from the third electronic device, to the first display unit.

In the above embodiments, the display area of the first display unit of the first display device may display the image signal as a whole, and accordingly, the display area of the second display unit of the second display device may also display the image signal as a whole. In practical applications, the display device may also support a multi-screen mode, that is, the display unit of the display device may be divided into multiple display areas, and different display areas of the display unit may display the display content from the same electronic device or different display content from different electronic devices.

The multi-screen mode of the display device may be divided into two types: picture-in-picture mode and hard split screen mode. The picture-in-picture mode may mean that the display unit is divided into two display areas, and the two display areas are used to display image signals from different electronic devices respectively. Generally, the image signals from different electronic devices may be different. Of course, the image signals from different electronic devices may also be the same, and there is no restriction on this.

The hard split screen mode may mean that the display unit is divided into two display areas, and the two display areas display different image signals from the same electronic device. Of course, the same image signal from the same electronic device may also be displayed in the two display areas.

On this basis, the picture-in-picture mode or hard split screen mode may be started on the first display device. In this application, the first display device and the second display device may also switch the signal source synchronously.

The implementation is explained in different cases in the following. First, the situation where the first display device and the second display device are in the picture-in-picture mode is introduced.

As shown in FIG. 9, which is another flow chart of the display control method, in another embodiment, the method may be applied to the first display device, and includes S901 to S903.

At S901, when the first display device is in the first display mode, a first image signal from the first electronic device is obtained through the first-type port, and a fourth image signal from the third electronic device is obtained through the third-type port, and the first image signal is displayed in the first display area of the first display unit of the first display device and the fourth image signal is displayed in the second display area of the first display unit.

In this embodiment, the first display device may turn on the picture-in-picture mode, and on this basis, the two display areas of the first display unit of the first display device may be used to display different image signals from different electronic devices.

For the convenience of distinction, the two display areas divided by the first display unit are respectively referred to as the first display area and the second display area. The first display area and the second display area may be different, but the first display area and the second display area may overlap partially, and of course, there may be no overlap, and there is no restriction on this.

On the premise that the first display device is connected to the second electronic device, the first display device and the second display device may maintain the same picture mode. Therefore, when the first display device turns on the picture-in-picture mode, the second display device may also turn on the picture-in-picture mode.

For example, when the first display device starts the picture-in-picture mode, the first display device may send a picture mode indication to the second display device, and the picture mode indication may be used to indicate that the second display device starts the picture-in-picture mode.

Correspondingly, the second display unit of the second display device may also be divided into two display areas, for example, the second display unit may be divided into a third display area and a fourth display area, and the two display areas of the second display unit may respectively display image signals from different electronic devices.

The first display area in the first display unit and the third display area in the second display unit may display different image signals from the same electronic device, and the second display area in the first display unit and the fourth display area in the second display unit may display different image signals from another electronic device.

In this embodiment, the third-type port may be different from the first-type port.

For example, the first-type port may be a Thunderbolt port, and the third-type port may be a DP port or an HDMI port; or, the first-type port may be a DP port, and the third-type port may be an HDMI port or a Thunderbolt port. Of course, there may be other possibilities, which will not be described in detail.

Similar to the first display device obtaining the first image signal from the first electronic device, the first electronic device may also directly obtain the fourth image signal from the third electronic device, or obtain the fourth image signal from the third electronic device through the second display device.

For example, the first display device may be connected to the third electronic device through the third port, and on this basis, the first display device may obtain the fourth image signal from the third electronic device through the third port.

As another example, the first display device may also be connected to the third electronic device through the second display device. In this case, the multi-function port connecting the first display device and the second display device may be considered to be the third-type port, and accordingly, the first display device may obtain the fourth image signal from the third electronic device from the second display device through the multi-function port.

For ease of understanding, based on the scene shown in FIG. 5, the picture-in-picture mode may be turned on in the display device 401 and the display device 402, for example. Assuming that the picture-in-picture mode is turned on in the display devices 401 and 402 in FIG. 5, the scene example diagram in FIG. 10 may be obtained.

As can be seen from FIG. 10, the display unit of the display device 401 is divided into a display area 406 and a display area 407, and the display unit of the display device 402 is divided into a display area 408 and a display area 409.

The image signals displayed in the two display areas of the display device 401 also come from the electronic devices connected to the Thunderbolt port and the DP port respectively. For example, the display device 401 obtains the image signal TBT1 from the laptop computer 403 through the Thunderbolt (TBT) port and displays it in the display area 406, and displays the image signal DP1 from the first host device 404 obtained through the DP port in the display area 407.

The image signals displayed in the two areas of the display device 402 may also come from the electronic devices connected to the Thunderbolt port and the DP port respectively. For example, the display device 401 obtains image signals TBT1 and TBT2 from the laptop computer 403 through the Thunderbolt port, and the display device 401 transmits the image signal TBT2 to the display device 402 through the Thunderbolt port, such that the display device obtains the image signal TBT2 from the laptop computer through the Thunderbolt port and outputs it to its display area 408, where the image signal TBT2 is different from the image signal TBT2. Similarly, the display device 402 obtains the image signal DP2 from the first host device 404 through the DP port and displays it in the display area 408, and the image signal DP2 and the image signal DP1 are different image signals from the same electronic device.

S902, it is determined that the first display device meets the condition for switching from the first display mode to the second display mode, and the first mode switching signal is output to the second display device connected to the first display device.

The first mode switching signal may be used to indicate that the second display device switches from the first display mode to the second display mode.

Unlike the previous second display mode which only needs to indicate the type of port to switch to, since both the first display device and the second display device in this embodiment start the picture-in-picture mode, it may be necessary to indicate the signal source to which each of the two display areas needs to switch through the second display mode, that is, the type of port to which each needs to switch.

For example, in the two display areas divided by the display unit of each display device, one display area may be used as the main display area and the other may be used as the auxiliary display area. Of course, it may also be distinguished or identified in other ways. Assuming that in the second display mode, the main display area is used to display the image signal obtained through the DP port, and the auxiliary display area is used to display the image signal displayed through HDMI, the second mode switching signal may need to indicate the display mode switching, that the signal source of the main display area is the DP port, and that the signal source of the auxiliary display area is the HDMI port.

The specific implementation of outputting the first mode switching signal to the second display device may refer to the previous related introduction, which will not be repeated here.

In an optional manner, considering that the first mode switching signal needs to indicate that the display mode is switched, and the signal sources of the two image signals corresponding to the two display areas may not be able to indicate the specific information of the first mode switching signal through the state signal group, the method of the embodiment of FIG. 8 may also be used to output the first mode switching signal to the second display device, as described above.

The specific implementation of determining the condition for switching from the first display mode to the second display mode may refer to the relevant introduction of the previous embodiment, which will not be repeated here.

In an optional manner, when it is determined that the condition for switching from the first display mode to the second display mode is met, whether the first display device and the second display device are both in multi-screen mode and in the image signal source synchronization state may be also determined. When the first display device and the second display device are both in multi-screen mode and in the signal source synchronization state, the first mode switching signal may be output to the second display device connected to the first display device.

In this embodiment, the first display device and the second display device may be in multi-screen mode and in the image signal source synchronization state, which may be that the first display device and the second display device have the signal source synchronization function turned on, and the first display device and the second display device have both turned on the picture-in-picture mode.

In this embodiment, when the first display device and the second display device have the signal source synchronization function turned on, the first display device and the second display device may also turn on the signal source automatic switching function by default.

S903, when the first display device is in the second display mode, the second image signal from the second electronic device is obtained through a second-type port, the fourth image signal from the third electronic device is obtained through a third-type port, the second image signal is output in the first display area of the first display unit, and the fourth image signal is output in the second display area of the first display unit.

Consistent with the disclosure, when the first display device switches from the first display mode to the second display mode, the source of the image signal of at least one of the first display area and the second display area in the first display unit may change.

One embodiment where the source of the image signal of only one of the first display area and the second display area changes will be used as an example. That is, the image signal displayed in the first display area may switch from the first electronic device connected to the first-type port to the second electronic device connected to the second-type port, but the image signal displayed in the second display area may still come from the third electronic device connected to the third-type port.

Correspondingly, when the second display device is in the second display mode, the second display device may obtain the third image signal from the second electronic device through the second-type port of the second display device, obtain the fifth image signal from the third electronic device through the third-type port of the second display device, output the third image signal in the third display area of the second display unit of the second display device, and output the fifth image signal in the fourth display area of the second display unit. The fifth image signal may represent a different image signal from the same electronic device as the fourth image signal.

It can be seen that in the second display mode, the image signals of the third display area of the second display unit and the first display area of the first display unit may belong to image signals obtained from the same electronic device through the same type of port. Similarly, the image signals of the fourth display area of the second display unit and the second display area of the first display unit may belong to image signals obtained from the same electronic device through the same type of port, thereby realizing that the image signal sources in the corresponding display areas of the two display devices are also switched synchronously when the first display device and the second display device are in the picture-in-picture mode.

Figure 11:
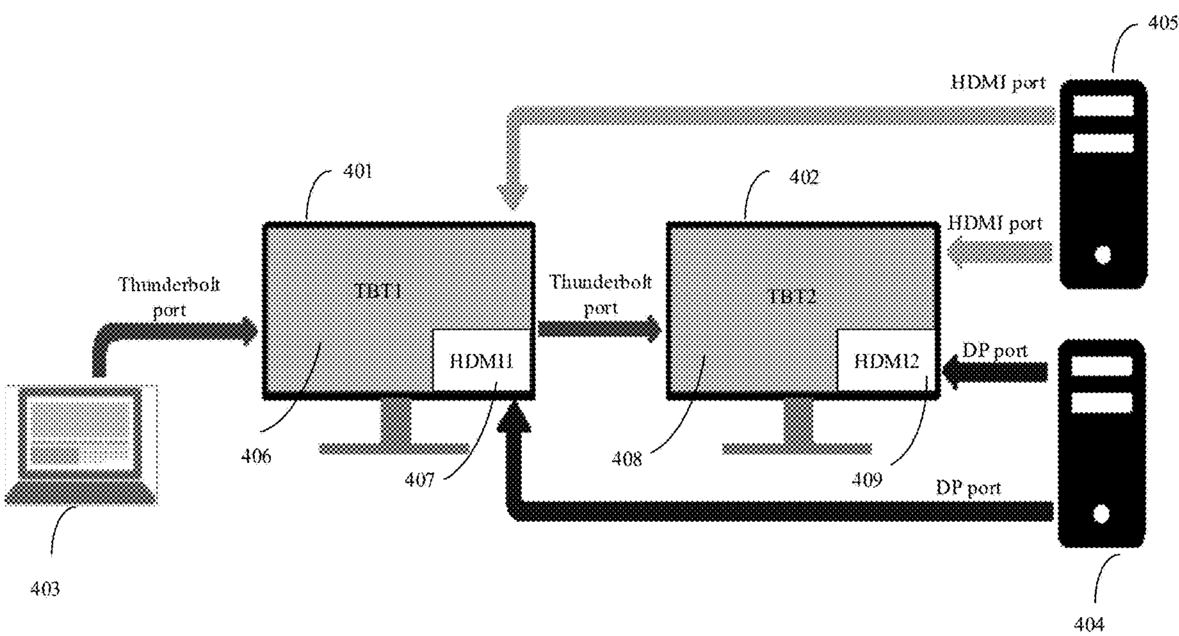

For ease of understanding, the images displayed by the first display device and the second display device in the second display mode are shown in FIG. 11.

Comparing FIG. 10 and FIG. 11, it can be seen that, in the second display mode, the image signal source of the display area 406 in the display device 401 still remains from the laptop computer 403 connected to the Thunderbolt port, and the image signal of the display area 407 in the display device 401 is switched from the first host computer 404 connected to the DP port to the second host device 405 connected to the HDMI port. As shown in FIG. 11, the display area 407 displays the image signal HDMI1.

Correspondingly, in the second display mode, the image signal of the display area 408 in the display device 402 is the same as that in the first display mode, and the image signal of the display area 409 is also switched to the image signal coming from the second host device 405 connected to the HDMI port, such that the display area 409 switches from displaying the image signal DP2 to displaying the image signal HDMI2. The sources of the image signals presented in the corresponding display areas of the display device 401 and the display device 402 are still the same.

It can be understood that the embodiment of FIG. 9 is only an implementation of the synchronous switching of the picture-in-picture mode of two display devices. In actual applications, the sources of the image signals displayed in the two display areas of the display device may all change.

For example, in a possible implementation, in the second display mode, the first display device may also obtain the fourth image signal from the third electronic device through the third-type port, obtain the second image signal from the second electronic device through the second-type port, output the fourth image signal in the first display area of the first display unit, and output the second image signal in the second display area of the first display unit.

In this implementation, in the second display mode, the image signal sources of the first display area and the second display area of the first display unit may be changed relative to the first display mode.

Accordingly, when the second display device is in the second display mode, the second display device may obtain the fifth image signal from the third electronic device through the third-type port of the second display device, obtain the third image signal from the second electronic device through the second-type port of the second display device, output the fifth image signal in the third display area of the second display unit, and output the third image signal in the fourth display area of the second display unit.

Figure 12:
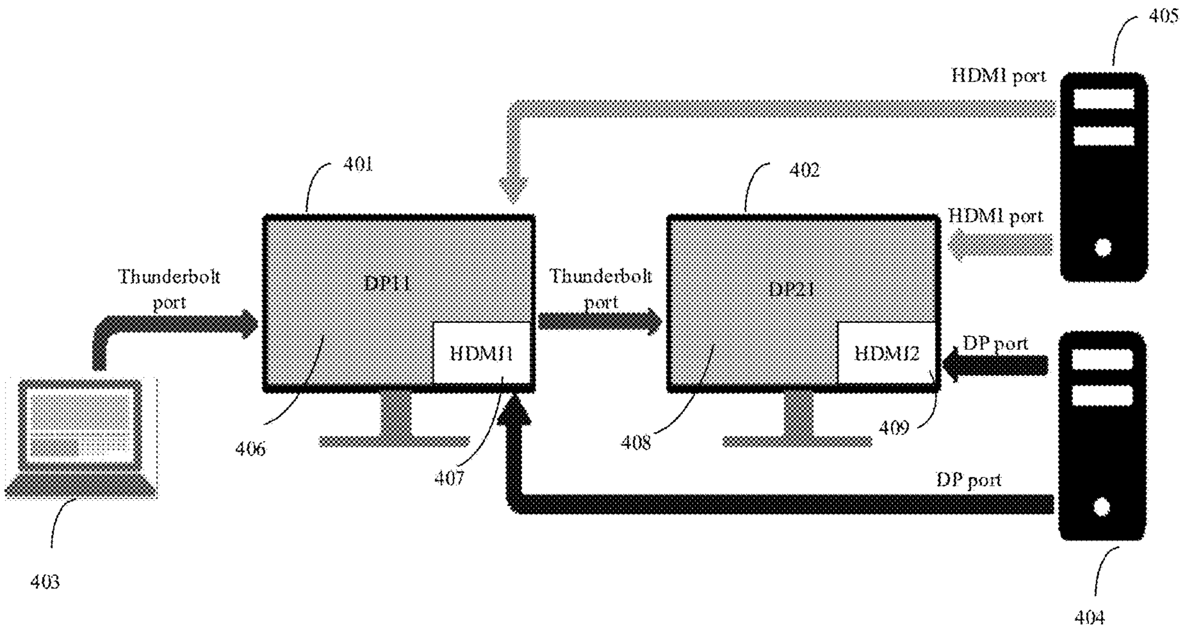

Still assuming that FIG. 10 is an example of the image displayed by the two display devices in the first display mode, in this implementation, the example of the image displayed by the two display devices in the second display mode can be seen in FIG. 12.

Comparing FIG. 10 and FIG. 12, it can be seen that in the first display mode, the display area 406 of the display device 401 displays the image signal TBT1 provided by the laptop computer 403 connected to the Thunderbolt port, and accordingly, the display area 408 of the display device 402 also displays the image signal TBT2 from the laptop computer 403. In the second display mode, the display area 406 of the display device 401 is switched to displaying the image signal DP11 provided by the first host device 404 connected to the DP port, and the display area 408 of the display device 402 is also switched to displaying the image signal DP21 provided by the first host device 404, such that the display area 406 of the display device 401 and the display area 408 of the display device 402 achieve synchronous switching of the signal source.

Similarly, when switching from the first display mode to the second display mode, the display area 407 of the display device 401 switches from displaying the image signal DP1 from the first host device 404 connected to the DP port to displaying the image signal HDMI1 from the second host device 404 connected to the HDMI port; and the display area 409 of the display device 402 also switches from displaying the image signal DP2 from the first host device 404 to displaying the image signal HDMI2 from the second host device 404.

In another possible implementation, when the display device is also connected to a fourth electronic device via a fourth electronic device of other port types, when the first display device is in the second display mode, the first display device may obtain the second image signal from the second electronic device via the second-type port, obtain a sixth image signal from the fourth electronic device via the fourth-type port, output the second image signal in the first display area of the first display unit, and output the sixth image signal in the second display area of the first display unit.

Correspondingly, when the second display device is in the second display mode, the second display device may obtain the third image signal from the second electronic device through the second-type port of the second display device, obtain a seventh image signal from the fourth electronic device through the fourth-type port of the second display device, output the third image signal in the third display area of the second display unit, and output the seventh image signal in the fourth display area of the second display unit.

The following describes the situation where two display devices start the hard split screen mode at the same time as the signal source synchronization function is started.

Figure 13:
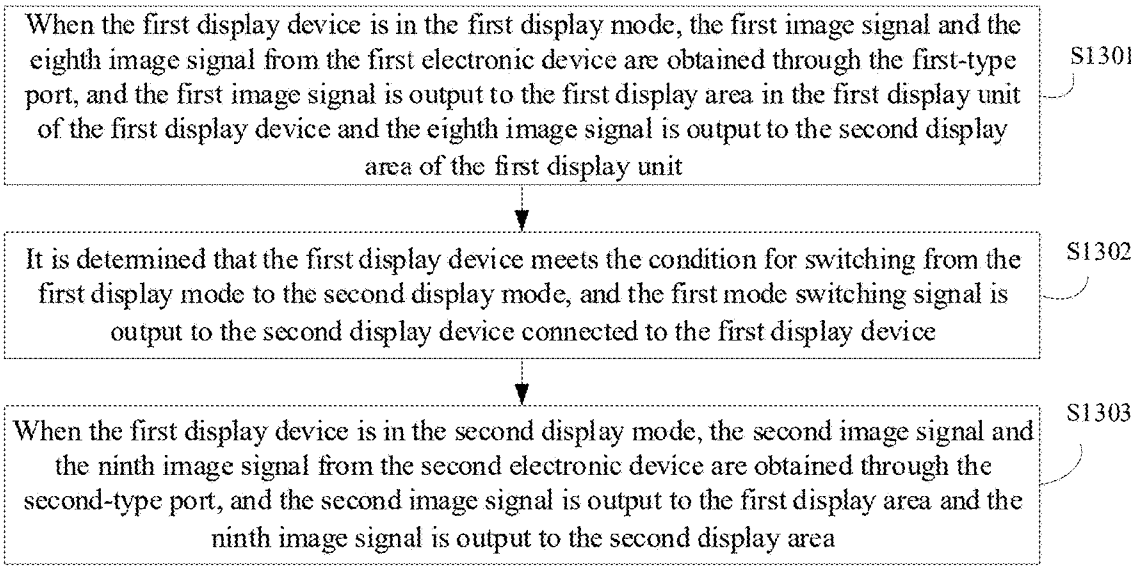
FIG. 13 is a flowchart of another exemplary display control method consistent with embodiments of the present disclosure.

As shown in FIG. 13, which is another flow chart of the display control method, in one embodiment, the method is applied to the first display device, and includes S1301 to S1303.

At S1301, when the first display device is in the first display mode, the first image signal and the eighth image signal from the first electronic device are obtained through the first-type port, and the first image signal is output to the first display area in the first display unit of the first display device and the eighth image signal is output to the second display area of the first display unit.

In this embodiment, when the first display device starts the hard split screen mode, the first display unit of the first display device may be divided into two display areas, and the two display areas may be used to display image signals from the same signal source (electronic devices connected to the same type of port), but the image signals displayed in the two display areas may be different.

The first image signal and the second image signal may be both from the first electronic device, and the two image signals may be different. Of course, they may also be image signals containing the same image content, and there is no restriction on this.

Figure 14:
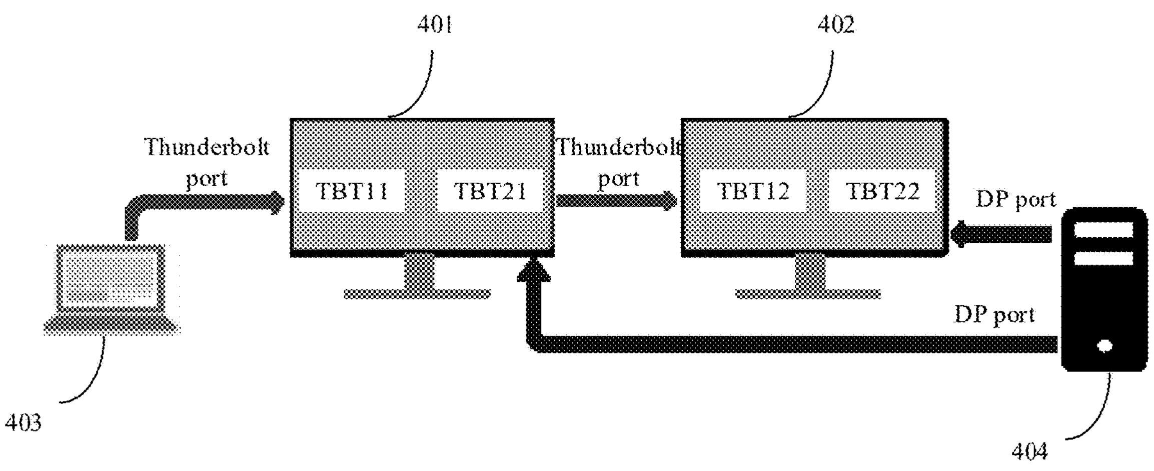
FIG. 14 and FIG. 15 are schematic architectural diagrams showing two exemplary application scenarios of FIG. 13 consistent with embodiments of the present disclosure.

To facilitate the understanding of this embodiment, references may be made to FIG. 14, which shows a scenario schematic diagram of two display devices starting the hard split screen mode at the same time.

For the convenience of description, FIG. 14 only takes one embodiment where each display device is directly or indirectly connected to different electronic devices through two different types of ports as an example.

FIG. 14 may be regarded as a display device that has turned on the hard split screen mode based on FIG. 4. Therefore, for the direct connection relationship between the display device and the electronic device in FIG. 14, references may be made to the relevant introduction of FIG. 4, which will not be repeated here.

As can be seen from FIG. 14, the display device 401 and the display device 402 currently use the laptop computer 403 connected to the Thunderbolt port as the signal source for providing the image signal.

At the same time, the display units of the display device 401 and the display device 402 are divided into two display areas respectively. Among them, in the display unit of the display device 401, the two display areas respectively display the image signal TBT11 and the image signal TBT21 from the laptop computer 403.

Similarly, in the display unit of the display device 402, the two display areas respectively display the image signal TBT12 and the image signal TBT22 from the laptop computer.

The display device 401 may obtain the image signal TBT11, the image signal TBT21, the image signal TBT12 and the image signal TBT22 from the laptop computer through the Thunderbolt port connected to the laptop computer 403. While the display device 401 outputs the image signal TBT11 and the image signal TBT21 to the two display areas of its display unit respectively, the display device 401 also transmits the image signal TBT12 and the image signal TBT22 to the display device 402 through the thunderbolt port connected to the display device 402, such that the display device 402 obtains the image signal TBT12 and the image signal TBT22 through the thunderbolt port. It is similar to the display device 402 obtaining the image signal through the thunderbolt port in the FIG. 4 and FIG. 5, except that in this embodiment, the display device 402 needs to obtain two copies of the image signal through the thunderbolt port.

S1302, it is determined that the first display device meets the condition for switching from the first display mode to the second display mode, and the first mode switching signal is output to the second display device connected to the first display device.

The first mode switching signal may be used to indicate that the second display device switches from the first display mode to the second display mode.

In this embodiment, the first display device may start the hard split-screen mode. Since the image signals displayed by the first display area and the second display area in the hard split-screen mode have the same source, the second display mode may indicate that the hard split-screen mode is currently in effect and the two display areas need to switch to a signal source.

Among them, for the condition for switching the first display mode to the second display mode, references may be made to the above description. Similarly, for the specific implementation of outputting the first mode switching signal to the second display device, references may be made to the above related description, which will not be repeated here.

In an optional manner, to avoid abnormal display mode switching caused by the first display device turning on the hard split screen mode and the second display device not turning on the hard split screen mode synchronously, in this embodiment, when both the first display device and the second display device turn on the multi-screen mode and are in the signal source synchronization state, the first mode switching signal may be output to the second display device.

In this embodiment, the multi-screen mode may be a hard split screen mode.

In this embodiment, when the first display device and the second display device turn on the signal source synchronization function (that is, they are in the signal source synchronization state), the first display device and the second display device may also turn on the hard split screen mode by default. Of course, the first display and the second display device may also turn on the signal source automatic switching function by default.

S1303, when the first display device is in the second display mode, the second image signal and the ninth image signal from the second electronic device are obtained through the second-type port, and the second image signal is output to the first display area and the ninth image signal is output to the second display area.

This step is similar to the embodiment of FIG. 1 above, except that in this embodiment, the first display unit is divided into two display areas. Therefore, it is necessary to obtain two image signals, namely, the second image signal and the ninth image signal, from the second electronic device through the second-type port to display the second image signal in one display area of the first display unit and the ninth image signal in another display area.

Similarly, since the second display device also turns on the hard split screen mode, when the second display device is in the second display mode, the second display device may obtain the third image signal and the tenth image signal from the second electronic device through the second-type port of the second display device, output the third image signal in the third display area of the second display unit of the second display device, and output the tenth image signal in the fourth display area of the second display unit.

It can be seen that when both the first display device and the second display device turn on the hard split screen mode, after the image signals corresponding to the two display areas of the first display device switch the signal sources, the two display areas of the second display device may also switch the signal sources of the image signals accordingly, such that the signal sources corresponding to the two display devices are switched synchronously.

Figure 15:
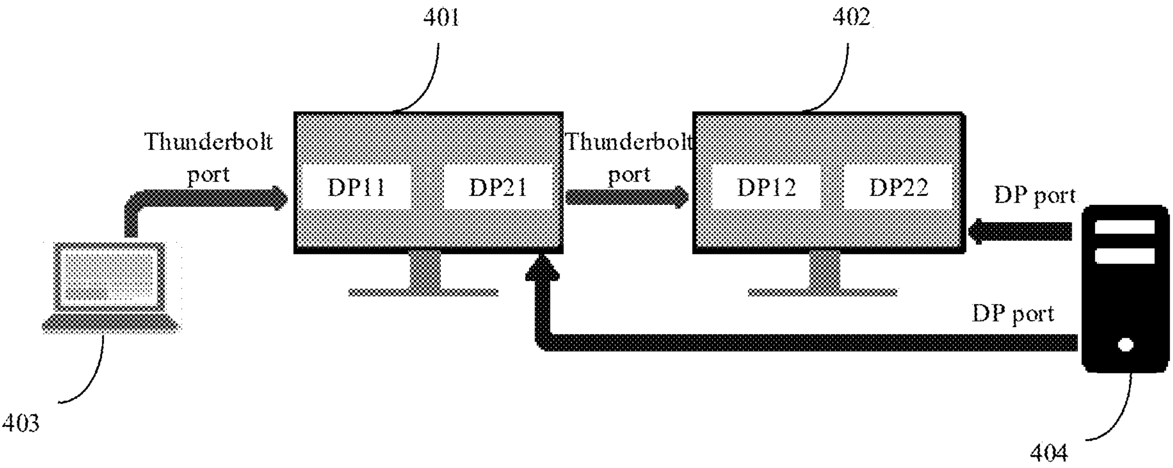

For ease of understanding, assuming that FIG. 14 is an example of image signals displayed by two display devices in the first display mode, an example of image signals displayed by two display devices in the second display mode may be seen in FIG. 15.

Comparing FIG. 14 and FIG. 15, it can be seen that in the second display mode, the signal sources of the two display areas of the display unit in the display device 401 are switched to the first host device 404 connected via the DP port, such that the two display areas of the display device 401 respectively display the image signal DP11 and the image signal DP21 from the first host device 404.

Correspondingly, in the second display mode, the image signals displayed by the two display areas of the display unit in the display device 402 also come from the first host device 404 connected via the DP port, such that the two display areas of the display device 402 respectively display the image signal DP12 and the image signal DP22 from the first host device 404.

The present disclosure also provides a computer-readable storage medium, which is configured to store at least one instruction, at least one program, a code set or an instruction set. The at least one instruction, at least one program, code set or instruction set may be loaded and executed by a processor to implement the display control method described in any of the above embodiments.

The present disclosure also proposes a computer program, which includes computer instructions. The computer instructions may be stored in a computer-readable storage medium. When the computer program is run on an electronic device, it may be used to execute the display control method in any of the above embodiments.

In the present disclosure, the words "first", "second", "third", "fourth" or similar words used in the present disclosure do not indicate any order, quantity or importance, but are only used to distinguish different members. It should be understood that the items used in this way can be interchanged where appropriate, such that the embodiments of the present disclosure described here can be implemented in an order other than that illustrated here.

It should be noted that each embodiment in the present disclosure is described in a progressive manner, and each embodiment focuses on the differences from other embodiments, and the same and similar parts between the embodiments can be referred to each other. At the same time, the features recorded in each embodiment in the present disclosure may be replaced or combined with each other, such that professionals and technicians in this field can implement or use the present disclosure. For the device embodiment, since it is basically similar to the method embodiment, the description is relatively simple, and the relevant parts can refer to the partial description of the method embodiment.

It should be noted that in this article, relational terms such as first and second are only used to distinguish one entity or operation from another entity or operation, and do not necessarily require or imply that there is any such actual relationship or order between these entities or operations. Also, the terms "include", "comprise" or any other variant thereof are intended to cover non-exclusive inclusion, such that a process, method, article or device including a series of elements includes not only those elements, but also other elements that are not explicitly listed, or also includes elements inherent to such a process, method, article or device. Without more constraints, an element defined by the phrase "comprising a . . . " does not exclude the existence of other identical elements in the process, method, article or apparatus comprising the element.

Various embodiments have been described to illustrate the operation principles and exemplary implementations. Those skilled in the art would understand that the present disclosure is not limited to the specific embodiments described herein and there can be various other changes, rearrangements, and substitutions. Thus, while the present disclosure has been described in detail with reference to the above described embodiments, the present disclosure is not limited to the above described embodiments, but may be embodied in other equivalent forms without departing from the spirit and scope of the present disclosure.

What is claimed is:

1. A display control method, performed by a first display device, comprising:

- when the first display device is in a first display mode, obtaining a first image signal from a first electronic device and outputting the first image signal to a first display unit of the first display device;
- determining, by the first display device, that the first display device meets a condition for switching from the first display mode to a second display mode, and outputting, by the first display device, a mode switching signal to a second display device connected to the first display device, to instruct the second display device to switch from the first display mode to the second display mode; and
- when the first display device is in the second display mode, obtaining, by the first display device, a second image signal from a second electronic device and outputting the second image signal to the first display unit;
- wherein, when the second display device is in the second display mode, the second display device obtains a third image signal from the second electronic device, and the third image signal is different than the second image signal and is output through a second display unit of the second display device.

2. The display control method according to claim 1, wherein outputting the mode switching signal to the second display device includes:

sending, through a first-type control chip of the first display device, the mode switching signal to a second-type control chip of the first display device; and transmitting, through the second-type control chip of the first display device, the mode switching signal to a second-type control chip of the second display device, to enable a first-type control chip of the second display device to obtain the mode switching signal through the second-type control chip of the second display device.

3. The display control method according to claim 1, wherein the mode switching signal is a first mode switching signal;

the method further comprising:

obtaining, through a second-type control chip of the first display device, a second mode switching signal transmitted by a second-type control chip of the second display device, the second mode switching signal instructing to switch from the second display mode to a third display mode;

transmitting, through the second-type control chip of the first display device, a status signal group to a third-type control chip of the first display device, the status signal group instructing to switch to the third display mode; and transmitting, through the third-type control chip of the first display device, the status signal group to a first-type control chip of the first display device, and responding, through the first-type control chip of the first display device, to the status signal group to switch from the second display mode to the third display mode;

wherein, when the first display device is in the third display mode, the first display device obtains an image signal from a third electronic device, and outputs the image signal, that comes from the third electronic device, to the first display unit.

4. The display control method according to claim 1, wherein the mode switching signal is a first mode switching signal;

the method further comprising:

obtaining, through a second-type control chip of the first display device, a second mode switching signal transmitted by a second-type control chip of the second display device, the second mode switching signal instructing to switch from the second display mode to a third display mode;

transmitting, through the second-type control chip of the first display device, a status signal to a third-type control chip of the first display device, the status signal instructing to switch a display mode of the first display device;

obtaining, through the third-type control chip of the first display device, the second mode switching signal from the second-type control chip of the first display device;

sending, through the third-type control chip of the first display device, the status signal to a first-type control chip of the first display device; and responding, through the first-type control chip of the first display device, to the status signal to obtain the second mode switching signal from the third-type control chip of the first display device, and switching the first display device from the second display mode to the third display mode based on the second mode switching signal;

wherein, when the first display device is in the third display mode, the first display device obtains an image signal from a third electronic device, and outputs the image signal, that comes from the third electronic device, to the first display unit.

5. The display control method according to claim 1, wherein determining that the first display device meets the condition for switching from the first display mode to the second display mode includes:

displaying a menu image, and obtaining a mode switching instruction based on a display mode switching operation performed in the menu image, the mode switching instruction instructing to switch from the first display mode to the second display mode; or in response to determining that the first display device is not able to obtain the first image signal from the first electronic device and determining that the first display device is able to obtain image signal from the second electronic device, determining that the condition for switching the first display mode to the second display mode is satisfied.

6. A display control method comprising:

when a first display device is in a first display mode, obtaining a first image signal from a first electronic device through a first-type port of the first display device, and outputting the first image signal to a first display unit of the first display device;

determining that the first display device meets a condition for switching from the first display mode to a second display mode, and outputting a mode switching signal to a second display device connected to the first display device, to instruct the second display device to switch from the first display mode to the second display mode; and when the first display device is in the second display mode, obtaining a second image signal from a second electronic device through a second-type port of the first display device, and outputting the second image signal to the first display unit, wherein when the second display device is in the second display mode, the second display device obtains a third image signal from the second electronic device through a second-type port of the second display device, and the third image signal is output through a second display unit of the second display device.

7. The display control method according to claim 6, further comprising:

when the first display device is in the first display mode or in the second display mode, obtaining a fourth image signal from a third electronic device through a third-type port of the first display device;

wherein:

outputting the first image signal to the first display unit includes displaying the first image signal in a first display area of the first display unit, and displaying the fourth image signal in a second display area of the first display unit;

outputting the second image signal to the first display unit includes:

outputting the second image signal in the first display area, and outputting the fourth image signal in the second display area; or outputting the fourth image signal in the first display area, and outputting the second image signal in the second display area; and when the second display device is in the second display mode, the second display device:

obtains the third image signal from the second electronic device through the second-type port of the second display device;

obtains a fifth image signal from the third electronic device through a third-type port of the second display device; and outputs the third image signal in one of a third display area of the second display unit and a fourth display area of the second display unit, and outputs the fifth image signal in another one of the third display area and the fourth display area.

8. The display control method according to claim 7, wherein outputting the mode switching signal to the second display device includes outputting the mode switching signal to the second display device in response to both the first display device and the second display device being in a multi-screen mode and in a signal source synchronization state.

9. The display control method according to claim 6, wherein:

obtaining the first image signal from the first electronic device through the first-type port of the first display device includes obtaining the first image signal and a fourth image signal from the first electronic device through the first-type port of the first electronic device;

outputting the first image signal to the first display unit includes outputting the first image signal to a first display area of the first display unit, and outputting the fourth image signal to a second display area of the first display unit;

obtaining the second image signal from the second electronic device through the second-type port of the first display device includes obtaining the second image signal and a fifth image signal from the second electronic device through the second-type port of the second display mode;

outputting the second image signal to the first display unit includes outputting the second image signal to the first display area, and outputting the fifth image signal to the second display area; and when the second display device is in the second display mode, the second display device:

obtains the third image signal and a sixth image signal from the second electronic device through the second-type port of the second display device;

outputs the third image signal in a third display area of the second display unit, and outputs the sixth image signal in a fourth display area of the second display unit.

10. The display control method according to claim 9, wherein outputting the mode switching signal to the second display device includes outputting the mode switching signal to the second display device in response to both the first display device and the second display device being in a multi-screen mode and in a signal source synchronization state.

11. A first display device comprising:

a multi-function port configured to connect to a second display device;

a first display unit; and a processing apparatus configured to:

when the first display device is in a first display mode, obtain a first image signal from a first electronic device and output the first image signal to the first display unit;

determine that the first display device meets a condition for switching from the first display mode to a second display mode, and output a mode switching signal to the second display device, to instruct the second display device to switch from the first display mode to the second display mode; and when the first display device is in the second display mode, obtain a second image signal from a second electronic device and output the second image signal to the first display unit;

wherein, when the second display device is in the second display mode, the second display device obtains a third image signal from the second electronic device, and the third image signal is different than the second image signal and is output through a second display unit of the second display device.

12. The first display device according to claim 11, wherein:

the processing apparatus is further configured to:

when obtaining the first image signal from the first electronic device, obtain the first image signal from the first electronic device through a first-type port of the first display device; and when obtaining the second image signal from the second electronic device, obtain the second image signal from the second electronic device through a second-type port of the first display device; and when the second display device is in the second display mode, the second display device obtains the third image signal from the second electronic device through a second-type port of the second display device.

13. The first display device according to claim 12, wherein:

the processing apparatus is further configured to:

when the first display device is in the first display mode or in the second display mode, obtain a fourth image signal from a third electronic device through a third-type port of the first display device;

when outputting the first image signal to the first display unit, display the first image signal in a first display area of the first display unit, and display the fourth image signal in a second display area of the first display unit; and when outputting the second image signal to the first display unit:

output the second image signal in the first display area, and outputting the fourth image signal in the second display area; or output the fourth image signal in the first display area, and outputting the second image signal in the second display area; and when the second display device is in the second display mode, the second display device:

obtains the third image signal from the second electronic device through the second-type port of the second display device;

obtains a fifth image signal from the third electronic device through a third-type port of the second display device; and outputs the third image signal in one of a third display area of the second display unit and a fourth display area of the second display unit, and outputs the fifth image signal in another one of the third display area and the fourth display area.

14. The first display device according to claim 13, wherein the processing apparatus is further configured to output the mode switching signal to the second display device in response to both the first display device and the second display device being in a multi-screen mode and in a signal source synchronization state.

15. The first display device according to claim 12, wherein:

the processing apparatus is further configured to:

when obtaining the first image signal from the first electronic device through the first-type port of the first display device, obtain the first image signal and a fourth image signal from the first electronic device through the first-type port of the first electronic device;

when outputting the first image signal to the first display unit, output the first image signal to a first display area of the first display unit, and output the fourth image signal to a second display area of the first display unit;

when obtaining the second image signal from the second electronic device through the second-type port of the first display device, obtain the second image signal and a fifth image signal from the second electronic device through the second-type port of the second display mode; and when outputting the second image signal to the first display unit, output the second image signal to the first display area, and output the fifth image signal to the second display area; and when the second display device is in the second display mode, the second display device:

obtains the third image signal and a sixth image signal from the second electronic device through the second-type port of the second display device;

outputs the third image signal in a third display area of the second display unit, and outputs the sixth image signal in a fourth display area of the second display unit.

16. The first display device according to claim 15, wherein the processing apparatus is further configured to output the mode switching signal to the second display device in response to both the first display device and the second display device being in a multi-screen mode and in a signal source synchronization state.

17. The first display device according to claim 11, wherein the processing apparatus is further configured to, when outputting the mode switching signal to the second display device:

send, through a first-type control chip of the first display device, the mode switching signal to a second-type control chip of the first display device; and transmit, through the second-type control chip of the first display device, the mode switching signal to a second-type control chip of the second display device, to enable a first-type control chip of the second display device to obtain the mode switching signal through the second-type control chip of the second display device.

18. The first display device according to claim 11, wherein:

the mode switching signal is a first mode switching signal;

the processing apparatus is further configured to:

obtain, through a second-type control chip of the first display device, a second mode switching signal transmitted by a second-type control chip of the second display device, the second mode switching signal instructing to switch from the second display mode to a third display mode;

transmit, through the second-type control chip of the first display device, a status signal group to a third-type control chip of the first display device, the status signal group instructing to switch to the third display mode; and transmit, through the third-type control chip of the first display device, the status signal group to a first-type control chip of the first display device, and respond, through the first-type control chip of the first display device, to the status signal group to switch from the second display mode to the third display mode; and when the first display device is in the third display mode, the first display device obtains an image signal from a third electronic device, and outputs the image signal, that comes from the third electronic device, to the first display unit.

19. The first display device according to claim 11, wherein:

the mode switching signal is a first mode switching signal;

the processing apparatus is further configured to:

obtain, through a second-type control chip of the first display device, a second mode switching signal transmitted by a second-type control chip of the second display device, the second mode switching signal instructing to switch from the second display mode to a third display mode;

transmit, through the second-type control chip of the first display device, a status signal to a third-type control chip of the first display device, the status signal instructing to switch a display mode of the first display device;

obtain, through the third-type control chip of the first display device, the second mode switching signal from the second-type control chip of the first display device;

send, through the third-type control chip of the first display device, the status signal to a first-type control chip of the first display device; and respond, through the first-type control chip of the first display device, to the status signal to obtain the second mode switching signal from the third-type control chip of the first display device, and switch the first display device from the second display mode to the third display mode based on the second mode switching signal; and when the first display device is in the third display mode, the first display device obtains an image signal from a third electronic device, and outputs the image signal, that comes from the third electronic device, to the first display unit.

20. The first display device according to claim 11, wherein the processing apparatus is further configured to, when determining that the first display device meets the condition for switching from the first display mode to the second display mode:

display a menu image, and obtain a mode switching instruction based on a display mode switching operation performed in the menu image, the mode switching instruction instructing to switch from the first display mode to the second display mode; or in response to determining that the first display device is not able to obtain the first image signal from the first electronic device and determining that the first display device is able to obtain image signal from the second electronic device, determine that the condition for switching the first display mode to the second display mode is satisfied.

* * * * *